Aug. 31, 1926.
E. R. CLARKSON
1,598,424
ORDERING, RECEIVING, AND MARKING BLANKS FOR MERCHANDISING TRANSACTIONS
Filed March 24, 1924    5 Sheets-Sheet 1
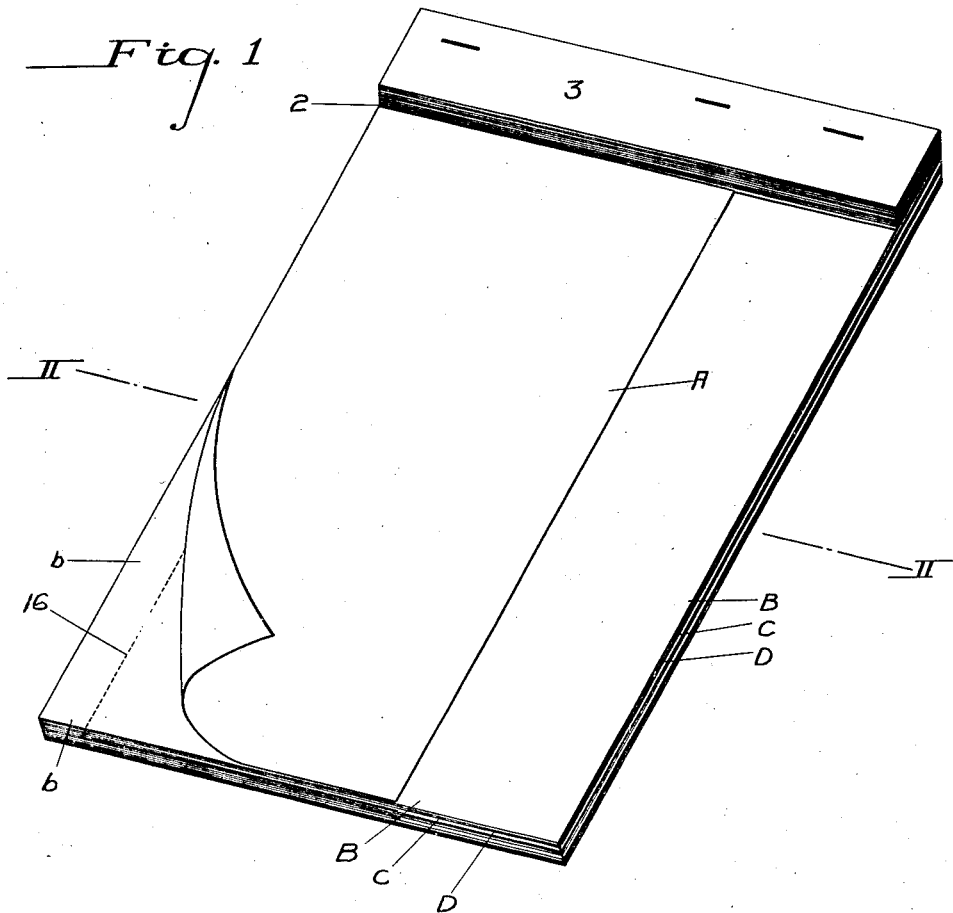
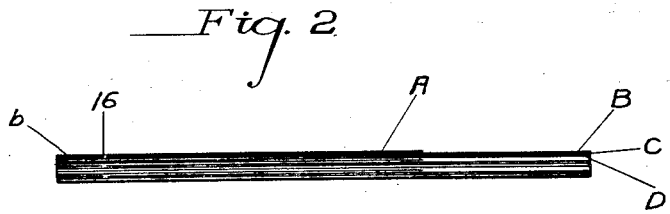
INVENTOR
Edward R. Clarkson
by C. M. Clarke
Attorney Aug. 31, 1926.

E. R. CLARKSON 1,598,424

ORDERING, RECEIVING, AND MARKING BLANKS FOR MERCHANDISING TRANSACTIONS

Filed March 24, 1924     5 Sheets-Sheet 2

Fig. 3

KAUFMANN'S

Date 2/14

MARK INVOICES CASES BALES and PACKAGES WITH OUR

DEPT NO. 23  AND OUR ORDER — No. 413

SHIPPING INSTRUCTIONS

FROM NEW YORK CITY {UNDER 90 POUNDS TO N.Y. OFFICE 1261 BROADWAY OVER 90 POUNDS VIA FREIGHT | FROM OTHER POINTS {UNDER 25 POUNDS VIA P.POST. 25 TO 90 POUNDS VIA EXPRESS OVER 90 POUNDS VIA FREIGHT.

DO NOT VALUE EXPRESS SHIPMENTS.

B. Kuppenheimer & Co.

Chicago, Ill.

Ship When. Mar. 1   Railroad. B & O.

| QUANTITY | LOT No. | DESCRIPTION | COST | |
|---|---|---|---|---|
| 10 | 2304 | Biltmore Suits | 37 | 50 |
| 5 | 1843 | Sport Suits | 22 | 00 |
| 12 | 2310 | Raincoats | 12 | 50 |

REMARKS  Own label

Terms 5/10/60X   From Date of Receipt of Goods F.O.B. Pittsburgh

Sold By   Estimated Am't of Order $600

J. Smith  Ordered By

E. Meyers   Countersigned By K.D.S. Inc

THIS ORDER IS SUBJECT TO THE FOLLOWING CONDITIONS.

INVENTOR
Edward R. Clarkson
by O. M. Clark
Attorney

Aug. 31, 1926.

E. R. CLARKSON 1,598,424

ORDERING, RECEIVING, AND MARKING BLANKS FOR MERCHANDISING TRANSACTIONS

Filed March 24, 1924   5 Sheets-Sheet 3

Fig. 4

| Date 15 2/14 KAUFMANN'S | | | | | | | No. 413 | |
|---|---|---|---|---|---|---|---|---|
| DEPT. NO. 23 | | | | | | | | |
| SEND WITH WHITE TO ORDER DEPARTMENT. | | | | | | O.K. O.K. O.K. | | RECEIVING DEPT. O.K. |
| B. Kuppenheimer & Co. Chicago, Ill. | | | | | | 3/6 3/12 | | DATE RECEIVED |
| Ship When Mar. 1 Railroad B.&O. | | | | | | | | |
| LOT No. | DESCRIPTION | COST | | RETAIL | | 3/2 | 3/7 | LINE |
| 10 2304 | Biltmore Suits | 37 | 50 | 50 | 00 | 5 | 5 | 1 |
| 5 1843 | Sport Suits | 22 | 00 | 30 | 00 | 5 | | 2 |
| 12 2310 | Raincoats | 12 | 50 | 18 | 00 | 6 | 6 | 3 |
| | | | | | | | | 4 |
| | | | | | | | | 5 |
| | | | | | | | | 6 |
| | | | | | | | | 7 |
| | | | | | | | | 8 |
| | | | | | | | | 9 |
| | | | | | | | | 0 |

REMARKS   Own label

Terms 5/10/60X   From Date of Receipt of Goods F.O.B. Pittsburgh

Sold By   J. Smith   Estimated Am't of Order $600

Ordered By   C. Meyers   Countersigned By K.D.S.Inc.

ADDITIONAL PART LOTS | DATES REC'D | CH'KED BY | DATE | HOW SHIPPED

INVENTOR
Edward R. Clarkson
by O.M. Clarke
Attorney

Aug. 31, 1926.

E. R. CLARKSON 1,598,424

ORDERING, RECEIVING, AND MARKING BLANKS FOR MERCHANDISING TRANSACTIONS

Filed March 24, 1924     5 Sheets-Sheet 4

*Fig. 5*

| LOT No. | DESCRIPTION | COST | RETAIL | | | LINE |
|---|---|---|---|---|---|---|
| 10 | 2304 Biltmore Suits | 37 50 | 50 00 | | | 1 |
| 5 | 1843 Sport Suits | 22 00 | 30 00 | | | 2 |
| 12 | 2310 Raincoats | 12 50 | 18 00 | | | 3 |
| | | | | | | 4 |
| | | | | | | 5 |
| | | | | | | 6 |
| | | | | | | 7 |
| | | | | | | 8 |
| | | | | | | 9 |
| | | | | | | 0 |

Date 2/14  KAUFMANNS

DEPT NO. 23—5

N° 413

SEND WITH WHITE TO ORDER DEPARTMENT.

B. Kuppenheimer + Co.
Chicago, Ill.

Ship When. Mar. 1   Railroad. B.&O.

REMARKS  Own label

Terms 5/10/60X   From Date of Receipt of Goods F.O.B. Pittsburgh

Sold By  J. Smith   Estimated Am't of Order  $600

Ordered By  C. Meyers   Countersigned By K.D.L. Inc.

ADDITIONAL PART LOTS | DATES REC'D | CHKED BY | DATE | HOW SHIPPED

INVENTOR
Edward R. Clarkson
by C. M. Clarke
Attorney

Aug. 31, 1926.                                                              1,598,424
E. R. CLARKSON
ORDERING, RECEIVING, AND MARKING BLANKS FOR MERCHANDISING TRANSACTIONS
Filed March 24, 1924     5 Sheets-Sheet 5

Fig. 6

15  
Date 2/14   KAUFMANN'S — 4

Nº 413

DEPT NO. 2 3 — 5

39    BILL RECEIVED   40

| DATE | AMOUNT |
|---|---|
| TOTAL ORDER | $ 600 — 41 |
| 3/2 | 372 50 |
|  | 227 50 |
| 3/7 | 262 50 |
| Over | 35 00 |

SEND WITH WHITE TO ORDER DEPARTMENT

B. Kuppenheimer & Co. — 8
Chicago, Ill.

9       10    14   30

Ship When Mar. 1   Railroad.   B&O.

| QUANTITY | LOT NO. | 13 — DESCRIPTION | COST | | RETAIL | |
|---|---|---|---|---|---|---|
| 10 | 2304 | Biltmore Suits | 37 | 50 | 50 | 00 |
| 5 | 1843 | Sport Suits | 22 | 00 | 30 | 00 |
| 12 | 2310 | Raincoats. | 12 | 50 | 18 | 00 |

REMARKS  
17 — Own label

19

18 — 5/10/60X  Terms    From Date of Receipt
                        of Goods F.O.B. Pittsburgh — 21
      Sold By           Estimated
20 — J. Smith           Am't of Order. 600
      Ordered By                              — 23
      E. Meyers.   Countersigned By K.D.S. Inc.
22

INVENTOR  
Edward R. Clarkson  
by C.M. Clarke  
attorney

Patented Aug. 31, 1926.

1,598,424

UNITED STATES PATENT OFFICE.

EDWARD R. CLARKSON, OF PITTSBURGH, PENNSYLVANIA.

ORDERING, RECEIVING, AND MARKING BLANKS FOR MERCHANDISING TRANSACTIONS.

Application filed March 24, 1924. Serial No. 701,265.

My invention consists of an improvement in ordering, receiving, and marking blanks for merchandising transactions, covering the incidents connected with each transaction or order.

It has in view to provide simple, accurate means for making an original record with a single writing on a plurality of sheets, with interposed carbon, so that the individual sheets may be used for their intended purpose in effecting supplemental recording of additional incidents of the transaction, with independent checking, ensuring accuracy, and having the various features of advantage and novelty, as hereinafter described.

Each blank utilizes a set of four sheets of paper, originally bound together as a serial set, with similar sets, preferably connected as a book, for detachment as used, in the manner hereinafter described.

In the drawings:

Fig. 1 is a perspective view of one of the books or groups of four series, showing the general arrangement, as used;

Fig. 2 is a cross sectional view on the line II—II of Fig. 1, but of one series of four sheets only;

Fig. 3 is a face view of the so-called white sheet;

Fig. 4 is a similar view of the pink sheet;

Fig. 5 is a similar view of the tissue sheet; and

Fig. 6 is a similar view of the yellow sheet.

The four several sheets used in making up a serial set are separably bound together on the perforated line 2, with the main back 3, for detachment in series after having been used with the usual intervening carbon paper for duplication throughout. Said four several sheets are identified as A, B, C and D, respectively, and each sheet is provided with certain common subject matter, as blanks, lines, spaces, etc., while the sheets B, C and D are provided with common additional subject matter of the same kind. Incidentally, sheet B is provided with a detachable slip for removal before being passed on to the checker, involving the necessity of checking independently of any reference to any of the other sheets.

In detail, sheet A or the white slip is the original order blank, which is to be filled out by the buyer and forwarded by the order department to the manufacturer or parties from whom the goods are purchased. For such purpose, sheet A, and each of the several sheets of the series, is imprinted with an identifying heading or caption of the firm, corporation, etc. using the blanks, as indicated at 4. Each sheet is provided with a common department number as indicated at 5; and also with a common identifying number, as at 6; and an order date space, as at 15.

Sheets B, C and D are provided with a common inscription as "Send with white to order department", as indicated at 7. All of the sheets are provided with a common inscription space for the name of the seller of the goods to whom the order is sent, preferably enclosed within a rectangular lined space, as indicated at 8. All of the four sheets are provided with a space 9 for insertion of the shipping date, and a similar space for insertion of the railroad or other common carrier, as indicated at 10.

All of the sheets are originally provided with vertical columns and horizontal lines, providing spaces for insertion of the items ordered under suitable headings, as quantity, lot number, description, and cost, as indicated at 11, 12, 13 and 14, respectively. The quantity column 11 originally appears on each of the four several sheets, but, in the case of the pink sheet B, it is on a separate detachable vertical strip $b$, perforably connected with the main sheet B as at 16, for detachment therefrom. The purpose of such detachment, after making the carbon inscription, is so that the pink sheet B, which goes to the checker, shall contain no information whatever as to quantity, so that he must then rely on checking with the goods as received, for further use of the pink sheet.

The white sheet A, and each succeeding sheet B, C and D, is provided at its bottom portion with common subject matter, but located to the right beyond the perforated line 16, so that all matter written in on the white sheet or order sheet will successively appear by carbon copy on the succeeding sheets. Such subject matter, for which lined spaces are provided, appears under the headings Remarks as at 17; Terms, as for time of payment, discount, etc., as indicated at 18; Receiving terminal for the shipment as at 19; Name of the seller as at 20; Estimated amount of order as at 21; Name of buyer ordering the goods from the order department, as at 22; and space for countersigned signature, as at 23.

The order sheet A only is imprinted at the bottom with any desirable information under the heading "This order is subject to the following conditions," as indicated at 24, but such subject matter appears only on order sheet A. Supplemental sheets B and C are provided with columns and horizontally line spaces for supplemental recording entries, under the several headings "Additional part lots," "Date received," "Checked by," "Date," "How shipped," as indicated at 25, 26, 27, 28, and 29, respectively.

Sheets B, C and D, on their portions which extend beyond the right hand edge of order sheet A, have common subject matter in registering relation for simultaneous marking through carbon, for insertion of the retail or selling price of the different items of the order, on corresponding levels with the cost spaces 14. These additional spaces are located, as shown, under the heading "Retail," as indicated at 30, sheets B, C and D.

Sheets B and C only are further provided with appropriate spaces for use by the receiving department, whereby the checker may insert the record or records of the goods as received in his department, either in one or more shipments. For such purpose, sheets B and C are provided with a series of vertical columns 31, with appropriate headings, as "Receiving department O. K." and "Date received," indicated at 32 and 33, respectively, for the insertion of the checker's O. K. mark and the date of receipt of the goods.

These spaces are in cross relation with the item spaces of the original order and the various duplicates, so that the date of receipt of the order, either entirely or in detached shipments, may be indicated in the vertical column "Date received" spaces. In the illustration shown of sheet B, Fig. 4, these insertions showing date received, as 3/6–3/12, respectively, compare with the dates of shipment as 3/2–3/7, respectively, entered on the intersecting spaces opposite heading "Retail" 30 and in original alinement with the spaces 11, 12, 13 and 14 of the white order sheet A. The shipping dates are ordinarily available from shipping advice from the seller, or from the usual bill of lading, received in due course.

Likewise, the checker will insert at lower corresponding and intersecting levels in the column or columns, and on correspondingly numbered lines therewith, in the number "line" 34, the number of items corresponding with the carbon copy of such items already appearing on sheet B, as received, and thus noted by the checker. In this manner, the total of items appearing in horizontal lines 1, 2, 3, etc. should tally with the totals of all items originally ordered, as shown by order sheet A, but without knowledge by the checker of such totals, because of the previous removal of the carbon marked quantity column or strip $b$ before sheet B is delivered to the checker. The checker is not supposed to know, when checking goods received, the total numbers of articles ordered, and he is merely supposed to check off the items as received. Then, after full delivery is supposed to have been made, the checker's notations may be compared with the items as originally ordered to determine whether they agree.

In addition to the "How shipped" blank 29, sheets B and C are also provided at the lower right hand corner with extensions 35 of vertical columns 31, with intersecting horizontal lines providing sub-spaces corresponding to appropriate headings "Checked by," "Date," and "How shipped," as at 36, 37, 38, respectively. As the checker uses the upper "O. K." and other blanks of columns 31, one or more successively, he simultaneously makes appropriate entries at the bottom opposite headings 36, 37, 38, as indicated on sheet B. These entries are made originally on that portion of sheet B extending beyond the original right hand edge of order sheet A, and it will be observed that sheet C only, in respect of such portion of sheet B, is an exact duplicate thereof.

In addition, sheet C or the tissue sheet, being of full width, also includes the "quantity" column 11 and receives the carbon impression of the original marking of the white order sheet A. Therefore, sheet C, which is retained in the custody of the buyer, includes all of the marked data originally appearing on the order sheet A plus the retail price markings under column 30, but nothing else.

It will be noted that sheets A, B, and C identify, in space 21, the estimated amount of order. This space is important in connection with observation of limitations on the order department as to current maximum limitation of any particular "line" or kind of goods. It is for the purpose of preventing any surcharge over the estimated budget for the particular department, undesirable over-stocking, and as an assistance in maintaining normal conditions of supply with relation to the demand for the particular kind of goods involved. For instance, in the transaction illustrated, the estimated or maximum amount of the order in space 21 is $600, and this limitation is to be approximately observed, until changed, or until another order for the same goods is issued.

Therefore, in order to keep a tally on such trade conditions, the yellow sheet D is provided, at the right hand side, in the space occupied by columns 31 of sheets B and C, with two independent columns of horizontal spaces under the sub-headings "Date" and "Amount," as indicated at 39 and 40, respectively. These columns and their sub-headings are under the heading or caption "Bill received" and have a "Total order" space 41 for entry of an amount corresponding with the amount of space 21 of order sheet A, as $600.

Such supplemental entry, therefore, appears only on sheet D, retained by the order department for such future checking purposes. When the invoice for the goods is received, the date and amount are entered therein, as 3/2 and $372.50. The date should correspond with the date in the first column 31 of pink sheet B, indicating first-shipment, independent of date received. The amount corresponds with the cost value of the first shipment of the several items of the order, i. e., 5 at $37.50; 5 at $22.00; and 6 at $12.50, or a total of $372.50. The order department, therefore, subtracts this amount from the estimated amount, and shows the unused balance of $227.50. Upon receipt of the remainder of the order, indicated in the second column 31 of sheet B, 5 at $37.50 and 6 at $12.50, the date 3/7, and the total of such second invoice or $262.50 are likewise entered, as shown in the next lower spaces of columns 39 and 40. The difference in amount, over or under the preceding balance of $227.50 is then indicated in the next space below, as "over—$35.00."

The order department is therefore advised, and an exact record is furnished of the appropriation or budget status for the line of goods involved, for its guidance, with regard to inventory or other trade conditions, as may be.

In its entirety, the series of four interrelated sheets constitutes means for systematically and accurately keeping an exact and self-proving record of the transaction or transactions involved. Its use and advantages will be readily understood and appreciated by all those familiar with the various problems of buying and selling goods, especially in department store business.

When making out the order A, the buyer will simultaneously make a complete carbon copy of all entries thereon on sheets B, C and D. He then enters in column 30 on sheet B the retail selling price at which the goods are to be sold, and sends all four sheets to the order department for O. K. counter-signature by the proper merchandise manager, in space 23. Such counter-signature by the order department on the original order and duplicated on sheets B, C and D, especially sheet B, is essential, otherwise the goods should not be received by the receiving department or checked by the checker. The original order is then mailed, the perforated strip b or quantity column is detached from sheet B and such sheet, without the quantity indication, is sent to the receiving department and the same is filed pending receipt of the goods, for use as explained, by the checker.

Thereafter the pink sheet B is used for making out the price tags or tickets containing such data as season letter (usually two for each year), month, order number (413), line number, and retail price.

Sheet B is then returned to the order department, where it will be stamped with the date received, and used to check the invoice and freight bills and for marking on the invoice the retail prices. In the event of part shipment only of the original order, sheet B will then be returned to the receiving department to await receipt of the balance of the order. In the event that all the columns become filled in on sheet B by the receiving department, the order department will make out a new complete copy on Form B for the unshipped balance of the original order, showing name of the manufacturer or seller, description of the items, cost and retail prices, same order number, etc., as the original order D. Such duplicate form B will be used exactly as the original Form B, except the sending out of the duplicate order sheet A, until all goods covered by the original order have been received and accounted for.

The buyer should keep an index record of the numbers of all orders placed with different manufacturers or sellers, for convenient reference, and each office checker should keep all bills checked up to date, and make periodical runs of the actual bills for accounting purposes.

The head of each receiving department should be responsible for sending the report sheets B to the order department promptly, and should enter the date of such sending on the usual unpacking slips before filing them. It will be seen that, when any order is sent out on sheet A, giving the purchase price, it is essential that the retail or selling price shall also appear, comparatively, on additional sheets B, C and D, as explained. This is of advantage in providing a basis for any change in retail price upon receipt of merchandise.

A further advantage is in the use of the common and distinguishing serial number 6 (413) especially in connection with the horizontal line numbers appearing in vertical column 34 of sheets B and C. Ordinarily, the order number 6 (413) and line number (34) are attached to the price and identification tag usually attached to the goods or merchandise. When at any time it is desired to learn the source of supply, cost price, lot number, terms, etc., a direct reference may be had to the pink sheet B, which is on file with other similar sheets in their numerical order.

There is, therefore, at all times an easily and quickly available means for securing desired information about any particular article of merchandise from its price tag, through such key connection and reference.

By the use of my improved blanks, I eliminate the necessity or use of the usual "line" and register books, or other records usually employed for maintaining information and data of the kind involved. This is because all the necessary information of this kind is simultaneously furnished and filed in the order department and in the buyer's files by the copies of original orders, with the subsequently added data, appearing on sheets B and C, and forming a related part of each order as issued.

The blanks are easily available and applicable to use with many kinds of business, especially where the turnover is frequent and the lines are numerous and diversified. It is very accurate, comparatively simple, and contributes to certainty and economy, without confusion, or liability to mistake. It may be amplified or modified in details of arrangement to adapt it to any special incidents or limitations of merchandising or trade, dependent on circumstances, without departing from the principles involved, but all such changes are to be understood as within the scope of the following claims.

What I claim is:

1. A manifold order blank including an upper sheet having an order form thereon provided with appropriately designated columns for the entry of data for goods ordered including a quantity-indicating column along one edge of the sheet for the entry of the quantities of goods ordered, and a lower sheet having an order form underlying the aforesaid order form to receive carbon impressions of the order data entered on the firstnamed order form, the lower sheet having a removable strip along one edge thereof below the quantity-indicating column of the upper sheet and having a portion projecting beyond the opposite edge of the upper sheet and containing appropriately designated spaces in appropriate relation to the order forms for the entry of data relating to the items appearing on the order forms.

2. A manifold order blank including an upper sheet having an order form thereon provided with appropriately designated vertical columns for the entry of data for goods ordered including a quantity-indicating column along the left hand edge of the sheet for the entry of the quantities of goods ordered, and a lower sheet having an order form underlying the aforesaid order form to receive carbon impressions of the order data entered on the firstnamed order form, the lower sheet having a removable strip along its left hand edge below the quantity-indicating column of the upper sheet and having a portion projecting beyond the right hand edge of the upper sheet and containing appropriately designated spaces in appropriate relation to the order forms for the entry of data relating to the items appearing on the order forms.

3. A manifold order blank including an upper sheet having an order form thereon provided with appropriately designated columns for the entry of data for goods ordered including a quantity-indicating column along one edge of the sheet for the entry of the quantities of goods ordered and also including a cost column for the entry of the cost prices of goods ordered, and a lower sheet having an order form underlying the aforesaid order form to receive carbon impressions of the order data entered on the firstnamed order form, the lower sheet having a removable strip along one edge thereof below the quantity-indicating column of the upper sheet and having a portion projecting beyond the opposite edge of the upper sheet and containing appropriately designated spaces in appropriate relation to the order forms for the entry of data relating to the items appearing on the order forms including a column for the entry of the retail prices of the goods ordered.

4. A manifold order blank including an upper sheet having an order form thereon provided with appropriately designated columns for the entry of data for goods ordered including a quantity-indicating column along one edge of the sheet for the entry of the quantities of goods ordered, and a lower sheet having an order form thereon underlying the aforesaid order form to receive carbon impressions of the order data entered on the firstnamed order form, the lower sheet having a removable strip along one edge thereof below the quantity-indicating column of the upper sheet and having a portion projecting beyond the opposite edge of the upper sheet and containing appropriately designated columns in appropriate relation to the order forms for the entry of checking data indicating the quantities of ordered goods received, checker's notations and dates.

5. A manifold order blank including an upper sheet having an order form thereon provided with appropriately designated columns for the entry of data for goods ordered including a quantity-indicating column along one edge of the sheet for the entry of the quantities of goods ordered, and two lower sheets each having an order form thereon underlying the aforesaid order form to receive carbon impressions of the order data entered on the firstnamed order form, one of said lower sheets being intended for use by a receiving department and having a removable strip along one edge thereof below the quantity-indicating column of the upper sheet, said lower sheet having a portion projecting beyond the opposite edge of the upper sheet and containing appropriately designated columns in appropriate relation to the order forms for the entry of checking data indicating the quantities of ordered goods received, checker's notations and dates, and the other lower sheet being intended for use by an order department and having a corresponding portion projecting beyond the lastnamed edge of the upper sheet and containing appropriately designated spaces for the entry of data relating to invoices received for the goods ordered.

In testimony whereof I hereunto affix my signature.

EDWARD R. CLARKSON.